(12) United States Patent
Galfsky et al.

(10) Patent No.: US 10,830,932 B2
(45) Date of Patent: Nov. 10, 2020

(54) THERMALLY STABLE OPTICAL FILTER

(71) Applicant: Elenion Technologies, LLC, New York, NY (US)

(72) Inventors: Tal Galfsky, Morristown, NJ (US); Saeed Fathololoumi, San Gabriel, CA (US); Thomas Baehr-Jones, Arcadia, CA (US); Matthew Streshinsky, New York, NY (US); Yury Dziashko, Weehawken, NJ (US)

(73) Assignee: Elenion Technologies, LLC, New York, NY (US)

( * ) Notice: Subject to any disclaimer, the term of this patent is extended or adjusted under 35 U.S.C. 154(b) by 60 days.

(21) Appl. No.: 16/231,726

(22) Filed: Dec. 24, 2018

(65) Prior Publication Data

US 2019/0212483 A1     Jul. 11, 2019

Related U.S. Application Data

(63) Continuation-in-part of application No. 15/855,242, filed on Dec. 27, 2017.

(51) Int. Cl.
*G02B 6/293* (2006.01)
*G02B 5/28* (2006.01)
*G02B 5/30* (2006.01)
*G02B 27/28* (2006.01)

(52) U.S. Cl.
CPC .................. *G02B 5/28* (2013.01); *G02B 5/30* (2013.01); *G02B 6/2935* (2013.01); *G02B 27/286* (2013.01)

(58) Field of Classification Search
CPC ......................... G02B 6/2935; G02B 6/29352
See application file for complete search history.

(56) References Cited

U.S. PATENT DOCUMENTS 6,400,870 B1 *   6/2002   Hill ...................... G02B 6/2821
                                                      385/3
2017/0324482 A1 *  11/2017   Kato ...................... H04J 14/02

* cited by examiner

*Primary Examiner* — Thanh Luu
(74) *Attorney, Agent, or Firm* — Stratford Managers Corporation (57) ABSTRACT

An on-chip optical filter including three different arm sections comprised of three different types of waveguides, e.g. shape, material or polarization, can achieve the same performance quality as external commercially available solutions with no addition costs of fabrication of the photonic integrated chip (PIC) and a footprint several orders of magnitude smaller than any of the conventional filters.

19 Claims, 9 Drawing Sheets

Silicon Nitride Waveguide

Figure 1B

Ridge Waveguide

Figure 1C

Strip-loaded Waveguide

Figure 7

THERMALLY STABLE OPTICAL FILTER

CROSS REFERENCE TO RELATED APPLICATIONS

This application is a continuation in part and claims priority from U.S. patent application Ser. No. 15/855,242 filed Dec. 27, 2017, which is hereby incorporated by reference herein in its entirety.

TECHNICAL FIELD

The present invention relates to a thermally stable optical filter, and in particular to a thermally stable and low-dispersion on-chip optical filter.

BACKGROUND

Current technology for optical applications, such as Integrated Tunable Laser Assemblies (ITLAs), spectroscopy, communication systems, and others that require a frequency filter, rely on bulky off-chip solutions, such as Fabry-Perot filters, grating reflectors, and color-filter arrays, often result in high-reflectivity, thereby requiring the inclusion of an isolator in the optical path. In addition to the filter an external photodetector is also required. The inclusion of any one of the above solutions is external to the integrated photonics chip, and therefore significantly increases the production cost and the physical footprint of the device.

An object of the present invention is to overcome the shortcomings of the prior art by providing a thermally stable, low-dispersion, on-chip optical filter.

SUMMARY OF THE INVENTION

Accordingly, the present invention relates to an optical filter comprising:
an input port for inputting an input optical signal;
a splitter for splitting the input optical signal into first and second sub-beams;
a first arm for receiving the first sub-beam, the first arm comprising a first section comprised of a first type of waveguide, and a second section comprised of a second type of waveguide different than the first type of waveguide;
a second arm for receiving the second sub-beam, the second arm comprising a third section comprised of a third type of waveguide different than the first and second types of waveguides;
a combiner for combining the first and second sub-beams into a combined output optical beam; and
an output port for outputting the output optical beam;
whereby the first, second and third sections comprise predetermined lengths $L_1$, $L_2$ and $L_3$ capable of substantially balancing changes of refractive index of the first, second and third sections with a change in temperature and wavelength.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
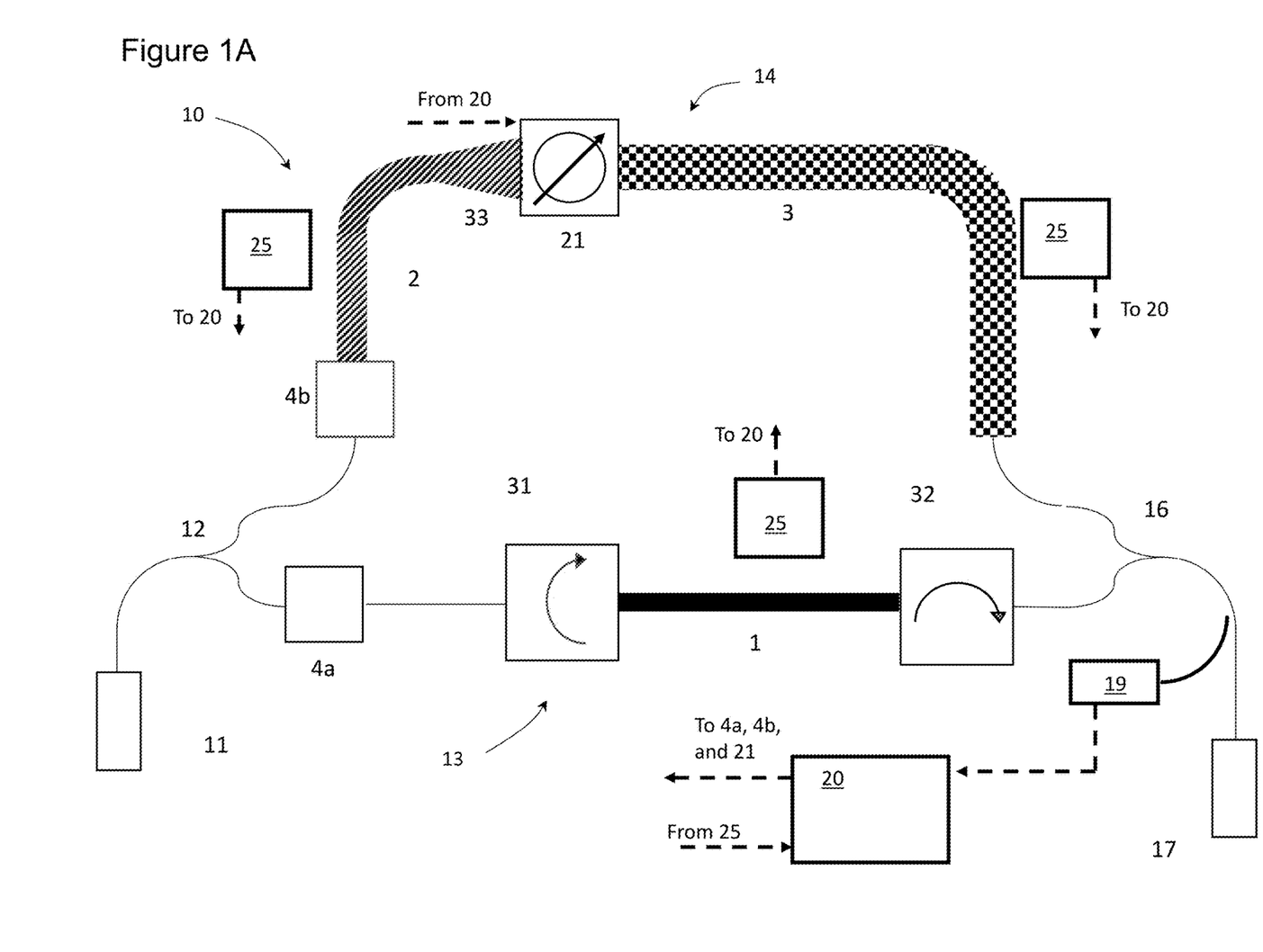
FIG. 1A is a schematic diagram of an optical filter in accordance with an embodiment of the present invention.

A dispersion-free, thermally-stable optical filter, in accordance with the present invention, may be comprised of an unbalanced Mach-Zehnder interferometer (UMZI) 10, which includes an input 11 for inputting an optical signal, a splitter 12 for dividing the optical signal into first and second sub-beams, a first MZ arm 13 for receiving the first sub-beam, a second MZ arm 14 for receiving the second sub-beam, a combiner 16 for combining the first and second sub-beams, and an output 17 for outputting the combined filtered optical signal. The first and second MZ arms 13 and 14 combined include at least three different waveguide sections 1, 2 and 3, each comprised of a different type of waveguides, where the difference may be in any one or more of waveguide shape, material, polarization, or mode-order providing a different refractive index thermal dependency. In the illustrated example, the first waveguide section comprises the first MZ arm 13, while two different waveguide sections 2 and 3 comprise the second MZ arm 14; however, any suitable combination of different waveguide sections 1, 2 and 3 is within the scope of the invention, and additional waveguide sections in either MZ arm 13 and 14 is also within the scope of the invention. The length and design of the waveguide sections 1, 2 and 3 may be selected such that the response of the UMZI device 10 counteracts the dispersion and thermal shift of each individual waveguide section 1, 2 and 3. The spectrum of the UMZI device 10 maintains near constant frequency spacing as a function of wavelength, e.g. <50 MHz drift from center Free Spectral Range, and remains stable with temperature changes, e.g. <1 pm/° C. or <50 MHz/° C.

Variations may include the use of any number of waveguide sections and any type or combination of types of waveguide geometry, material, polarization, or mode-order e.g. means for providing a different change of index of refraction with temperature. For example: any combination of, bus waveguides, ridge waveguides, strip-loaded waveguides, slab waveguides, segmented waveguides, W-shaped waveguides, expanding waveguide, e.g. height and/or width, tapering waveguide, e.g. height and/or width, semiconductor waveguides, e.g. silicon, with or without doping, dielectric waveguides, e.g. silicon nitride or silicon oxynitride, with or without doping, TM polarization, and TE polarization. The shape, i.e. cross-section, of the waveguides in the first and second arms 13 and 14 may also be different from each other to provide a different change in index with temperature, and therefore minimal temperature sensitivity. For example: one of the first and second arms 13 and 14 may comprise a rectangular or ridge cross-section with first height and width dimensions, while the other arm may comprise a rectangular or ridge cross-section with at least one of second different height and a second different width. In another example the cross-section of the first and second arms 13 and 14 may have different shapes, e.g. one of the first and second arms 13 and 14 may include a rectangular cross section (ridge), while the other includes a strip-loaded or rib waveguide cross-section, comprising a stepped or inverted T structure, with a slab portion and a ridge portion. In another possible embodiment, the light in one of the first and second arms 13 and 14 may be rotated from the usual mode, e.g. TE, to the orthogonal mode, e.g. TM, using a first polarization rotator 31 at the beginning of the first arm 13, and then rotated back to the original polarization, e.g. TE, by a second polarization rotator 32, at the end of the first arm 13 Different modes may be used because the derivative of $n_{eff}$ with respect to temperature is significantly different for the TM mode as compared to the TE mode.

If the first and second waveguides 13 and 14 are designed with near flat dispersion, which is difficult but possible to achieve in reality, a two different waveguide section version may be used to achieved a thermally stable device. Alternatively designs with three or more sections 1, 2 and 3, each with a different type of waveguide may be used to control any desired parameter. For example, parameters influenced by fabrication or parameters depending on the 2nd derivatives.

The Free Spectral Range (FSR) of a Mach Zehnder interferometer made of a single type of waveguide is given by the following equation:

$$FSR(Hz) = \frac{c}{n_g(\lambda) \cdot L} \quad \text{-1-}$$

where c is the speed of light, $n_g$ is the group index, and L is the unbalance (namely, the path difference) between the two arms of the MZI. Notice that the group index $n_g$ and therefore the FSR depends on the wavelength, $\lambda$.

The resonant wavelength drift for a selected wavelength as a function of temperature is given by:

$$\frac{d\lambda}{dT} = \lambda \frac{dn/dT}{n_g} \quad \text{-2-}$$

Therefore, an UMZI made of a single type of waveguide would experience both thermal drift of the resonant wavelength, which depends on the waveguide thermal coefficient, dn/dt, and a change in FSR which depends on dispersion, i.e. index dependence on the wavelength $\lambda$.

Figure 2A:
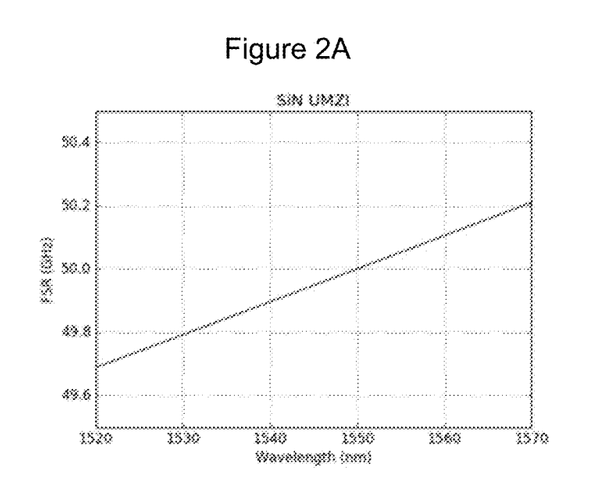
FIG. 2A is a plot of FSR vs wavelength for a conventional UMZI composed of silicon nitride waveguides.
Figure 2B:
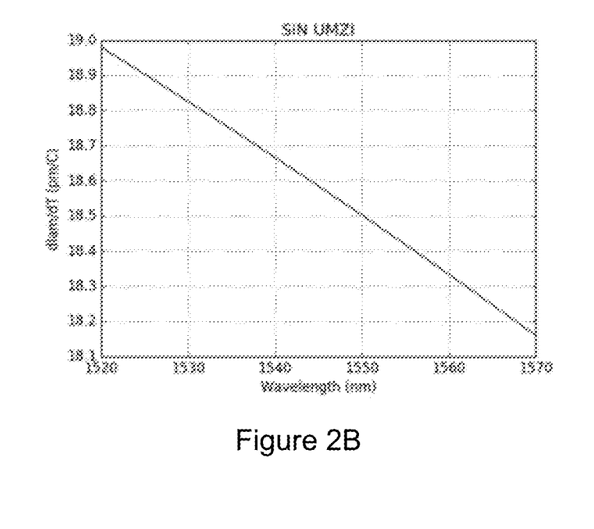
FIG. 2B is a plot of change in wavelength with temperature vs wavelength for a conventional UMZI.

FIG. 2A illustrates the dependence of the FSR frequency on wavelength for an UMZI composed of a silicon nitride (SiN) waveguide with dimensions of 300×300 um and designed to have an FSR of 50 GHz at 1550 nm. While the FSR is indeed 50 GHz at a wavelength of 1550 nm the change in FSR from the desired frequency increases the further the operating wavelength is from 1550 nm. In the graph a change of −300 MHz and +200 GHz from the intended FSR is seen at the edges of the filter range, 1520 nm and 1570 nm respectively. FIG. 2B plots the change in wavelength per degree Celsius, $$\frac{d\lambda}{dT},$$

which is about 18 pm/° C. therefore, without active temperature control this UMZI would drift more than half the FSR with a change of ~10° C.

Figure 1B:
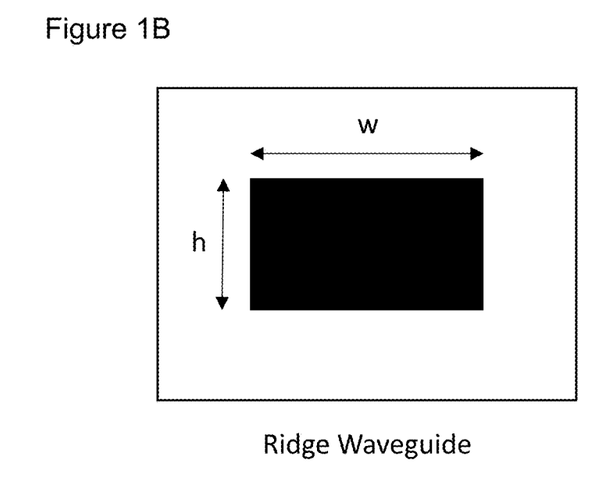
FIGS. 1B to 1D are cross-section views of the waveguide sections of the optical filter of FIG. 1A.

Both the temperature drift and the FSR change may be minimized by including at least three different waveguide sections 1, 2 and 3, each comprised of a different type of waveguide, e.g. means for providing a different change of index of refraction with temperature, to counteract the effects of dispersion and thermal expansion. For the example illustrated in FIG. 1A, a design with three different waveguide sections 1, 2 and 3 with different types of waveguides is illustrated. The imbalance is between the first waveguide section 1 comprised of a coiled ridge waveguide, see FIG. 1B, in the first arm 13 of the UMZI device 10, and in the second arm 14, the second waveguide section 2 comprised of a coil of strip-loaded waveguide, see FIG. 1C, and the third waveguide section 3 comprised of a length of Silicon Nitride (SiN) ridge waveguide, see FIG. 1D. In the model below the lengths of the three different types of waveguides are used as tuning knobs to control dispersion and thermal drift of the UMZI device 10. The model can be expanded to use any number of waveguide sections in order to be able to control any number of parameters.

All of the above different types of waveguide sections 1, 2 and 3, e.g. means for providing a different change of index of refraction with temperature, in any combination may be used to create athermal and dispersion free devices as well as to control other desired parameters including but not limited to dispersion, thermal response across wavelength, fabrication variation, which can shift the group index and thermal coefficients, and device extinction ratio. Therefore, a generalized system of equations may be formulated for any desired control parameter. For a device where N parameters are needed to be controlled, the number of waveguide types in the system must be N+1, where N is the number of control parameters denoted by $P_i$ where i enumerates the parameter (i=1 . . . N). The set of equations below enables optimization of any desired parameters when solved for the waveguides lengths vector $L=[L_1, L_2, \ldots, L_{(N+1)}]$:

$$FSR(Hz) = \frac{c}{n_{g_1} \cdot L_1 - \sum_{j=n+1}^{N+1} n_{g_j} \cdot L_j}. \quad \text{eq 1}$$

-continued $$\hat{O}_2^- P_2 = f_i(L_1, \ldots, L_{N+1}).\qquad\text{eq 2}$$

$$\ldots$$

$$\hat{O}_N^- P_N = f_i(L_1, \ldots, L_{N+1}).\qquad\text{eq N}$$

where Ôi is an operator acting on parameter $P_j$. The set of equations is solved to obtain the lengths of the different types of waveguide sections, $L_1, \ldots, L_{N+1}$. The location of each type of waveguide section, i.e. in the first or second arm of the UMZI is determined by the sign of in the solutions vector (positive or negative).

Figure 3:
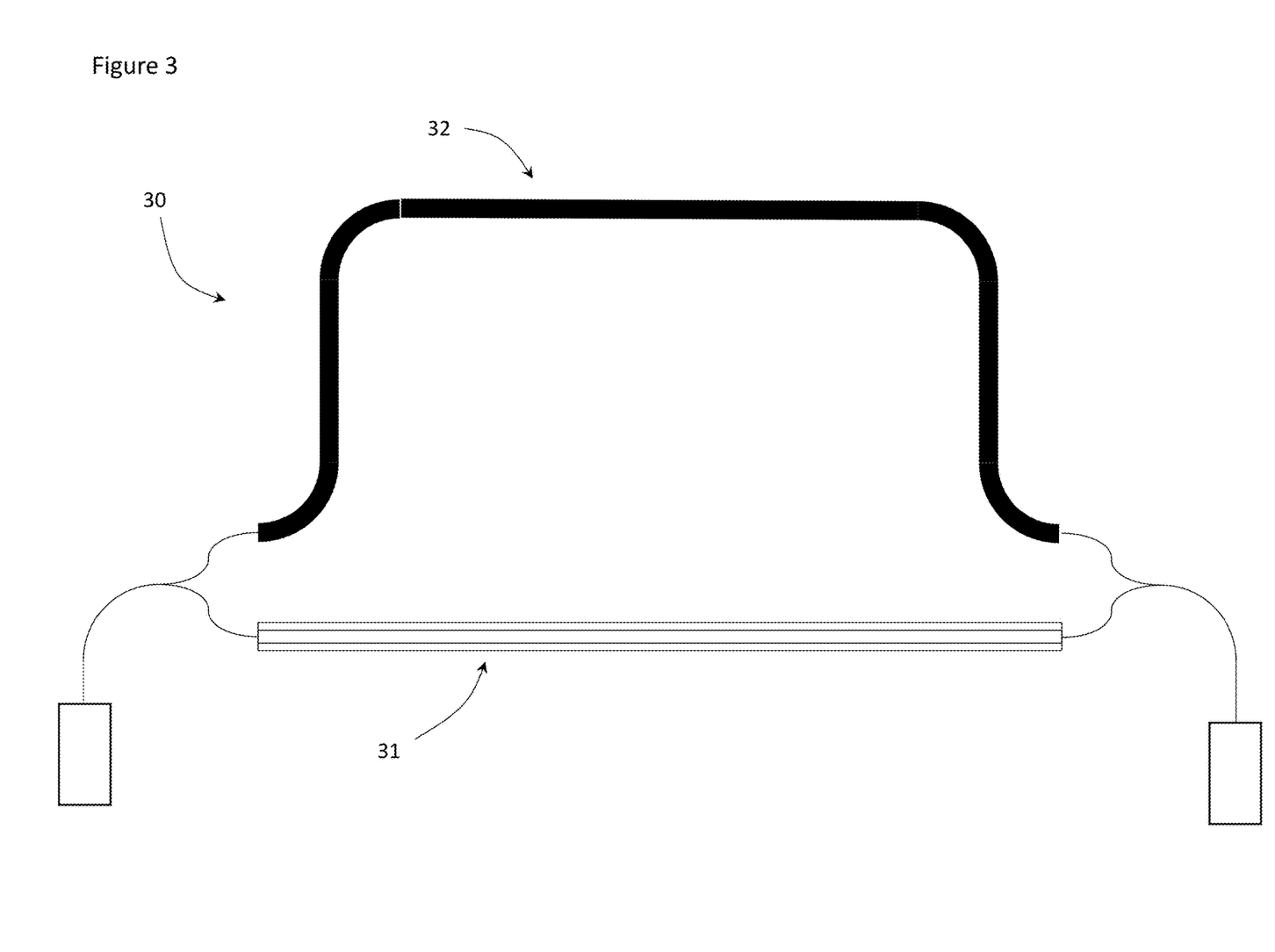
FIG. 3 is a schematic diagram of an optical filter in accordance with another embodiment of the present invention.

For example, with reference to FIG. 3, for a dispersion-less UMZI 30 which is not required to be athermal, only a change in FSR with wavelength close to zero is required. Therefore, the operator is defined as Ô=d/dλ which operates on the equation for FSR. Since control of only one parameter is desired the UMZI may include only two different types of waveguides 31 and 32 with lengths $L_1$, and $L_2$, along with the other elements of the UMZI 10 of FIG. 1A.

The equation to control the FSR of the optical filter device 30 is given by:

$$FSR(\text{Hz}) = \frac{c}{n_{g1} \cdot L_1 - n_{g2} \cdot L_2}\qquad\text{-3-}$$

In order to minimize the change in FSR with respect to wavelength, the derivative with respect to wavelength should equal zero:

$$\frac{dFSR}{d\lambda} = 0\qquad\text{-4-}$$

And the waveguide lengths $L_1$ and $L_2$ may be obtained from this set.

For a thermally stable dispersion compensated UMZI 10 such as the one in FIG. 1A a third different type of waveguide section needs to be added with different thermal dependence for each type of waveguide section 1, 2, 3, $dn_i/dT$, i=1, 2, 3. And the parameter control equations are as follows.

The FSR which is a constant value is given by:

$$FSR(\text{Hz}) = \frac{c}{n_{g1} \cdot L_1 - (n_{g2} \cdot L_2 + n_{g3} \cdot L_3)}\qquad\text{-5-}$$

The wavelength drift of the optical filter device 10 is given by:

$$\frac{d\lambda}{dT} = \lambda \frac{\frac{dn_1}{dT}L_1 - \frac{dn_2}{dT}L_2 - \frac{dn_3}{dT}L_3}{n_{g1} \cdot L_1 - n_{g2} \cdot L_2 - n_{g3} \cdot L_3}\qquad\text{-6-}$$

Accordingly, in order to minimize the thermal drift:

$$\frac{dn_1}{dT}L_1 - \frac{dn_2}{dT}L_2 - \frac{dn_3}{dT}L_3 = 0\qquad\text{-7-}$$

The last equation requires the minimization of the change in FSR with respect to wavelength since the group indices are wavelength dependent:

$$\frac{dFSR(L1, L2, L3)}{d\lambda} = 0\qquad\text{-8-}$$

Solving equations 5, 7, and 8 for $L_1$, $L_2$, and $L_3$ yields the lengths of waveguide sections 1, 2 and 3 required to achieve a design with minimal thermal drift and FSR change.

The same approach can be extended for more control parameters. For example, one might wish to minimize the thermal response across a range of wavelength as well. In that case another waveguide is required and equation 7 above can be derived with respect to wavelength:

$$\frac{d}{d\lambda}\left(\frac{dn_1}{dT}L_1 - \frac{dn_2}{dT}L_2 - \frac{dn_3}{dT}L_3 - \frac{dn_4}{dT}L_4\right) = 0$$

The formulation above may be used to create MZIs which are optimized for any number of desired controls. The sign of $L_1, L_2, \ldots, L_N$ and therefore the location of the waveguide section in the top or bottom arm will be determined by solving the set of equations.

The equations are written based on an initial assumption, i.e. that L1, which is the length for a specific type of waveguide in waveguide section 1, is located in the first arm 13 and all the other waveguide sections 2 and 3 (L2, L3, . . . ) are located in the second arm 14. Only after the above-identified equations are solved are the location of the waveguide sections 1, 2 and 3 finalized.

For example, as an initial selection: the first waveguide section 1 is comprised of SiN, the second waveguide section 2 is comprised of a strip loaded Si waveguide, and the third waveguide section 3 is comprised of a ridge Si waveguide. The equation for FSR is written as:

$$FSR = c/(n_{g1} \cdot L_1 - n_{g2} \cdot L_2 - n_{g3} \cdot L_3)$$

However, there are also two other equations for thermal response and dispersion. Once the set of three equations are solved for L1, L2 and L3 they will have a numerical value with a positive or negative sign, e.g. L1=3800 um, L2=3190 um, L3=−2250 um. A negative sign indicates that the initial assumption was incorrect, and that the third waveguide section 3 should actually go with the first waveguide section 1. When the values are plugged back into the equation for FSR the waveguide sections should be rearranged so that terms with the same sign are placed in the same arm.

$$FSR = c/(n_{g1} \cdot 3800 + n_{g3} \cdot 2250 - n_{g2} \cdot 3190)$$

Accordingly, waveguide sections 1 and 3 (SiN and ridge) should be in the second arm 14, and the strip-loaded waveguide section 2 should be in the first arm 13.

Figure 2C:
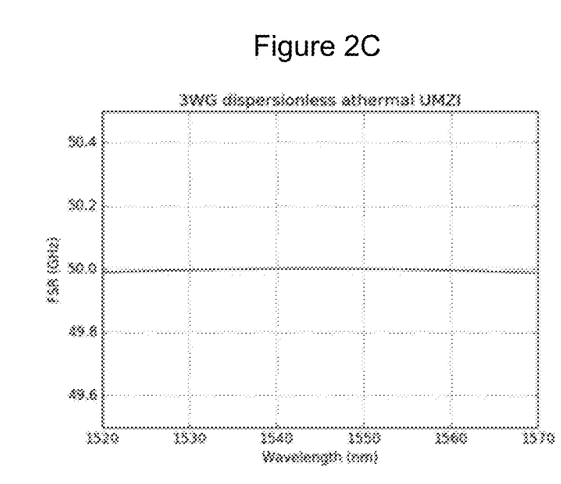
FIG. 2C is a plot of FSR vs wavelength for the optical filter of FIG. 1.
Figure 2D:
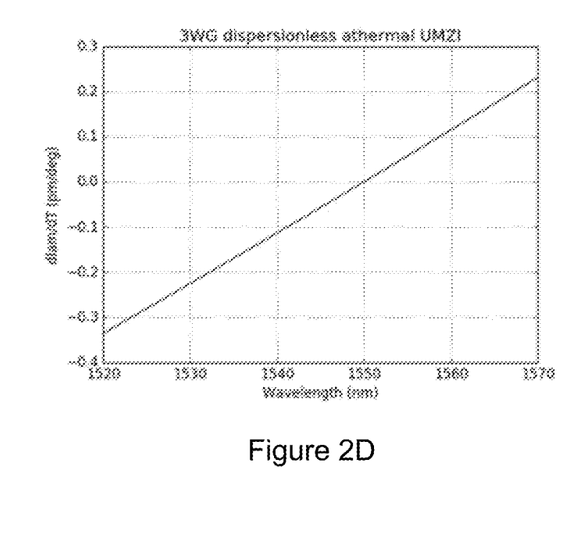
FIG. 2D is a plot of change in wavelength with temperature vs wavelength for the optical filter of FIG. 1.

FIGS. 2C and 2D plot the FSR as a function of wavelength and dλ/dT for the three waveguide UMZI optical filter device 10. The optical filter device 10 achieves near flat dispersion, i.e. <10 MHz FSR drift from 50 GHz across the C-band, as well as a thermal response of less than 1 pm/° C. across the C band.

FIGS. 4A to 4D illustrate the responses from optical filter devices fabricated with 100 GHz FSR. For each device: The dots in the upper graph represents resonant minimum wavelength of the UMZI, the lower graph plots a zoomed region of the spectrum. The first three graphs, FIGS. 3A, 3B and 3C illustrate the thermal drift of a UMZI comprised of a single type of waveguide, i.e. FIG. 3A Silicon Nitride (SiN) waveguide (cross-section depicted in FIG. 1D, h3=w3=300 nm) and a total length of 3800 µm, FIG. 3B ridge waveguide with a total length of 2550 µm (cross-section in FIG. 1B, h=500 nm w=220 nm), and FIG. 3C strip-loaded waveguide with a total length of 3190 µm (cross-section in FIG. 1C, h1=220 nm, h2=120 nm, w1=500 nm, w2=10 µm). For example: the thermal coefficients for the waveguides may be:

$$\frac{d_{n1}}{dT} = 2E-5, \frac{d_{n2}}{dT} = 2.05E-4, \frac{d_{n3}}{dT} = 1.95E-4$$

for the SiN waveguide, ridge waveguide, and strip-loaded waveguide, respectively. The exact length for the waveguide sections 1, 2 and 3 in the device 10 may be determined based on measurements of the group index and thermal coefficient of these waveguides as a function of wavelength. Whereas FIG. 3D illustrates a thermally stable optical filter device 10 at 100 GHz. The thermally stable design has orders of magnitude lower thermal drift than the best single waveguide design, i.e. the SiN waveguide device of FIG. 3A.

Figure 4A:
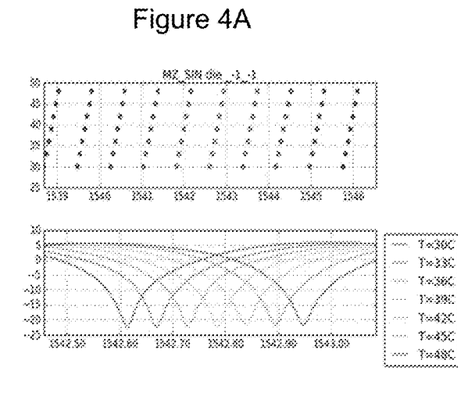
FIGS. 4A, 4B and 4C illustrate the thermal drift of a conventional UMZI comprised of a single type of waveguide, i.e. silicon nitride, ridge and strip-loaded, respectively.
Figure 4B:
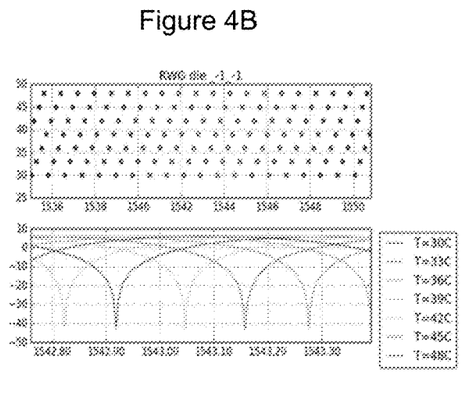
Figure 4C:
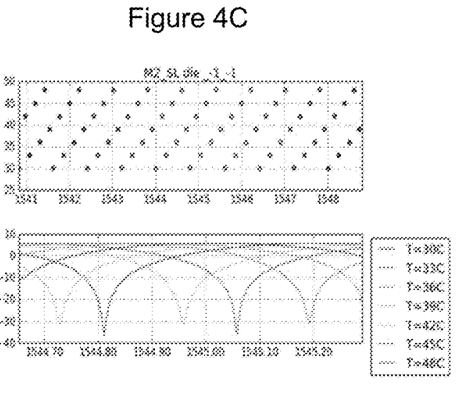
Figure 4D:
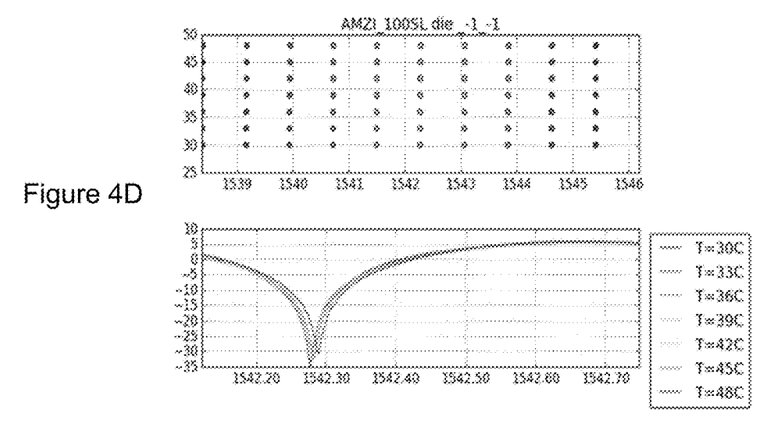
FIG. 4D illustrates the thermal drift of the optical filter of FIG. 1.
Figure 4E:
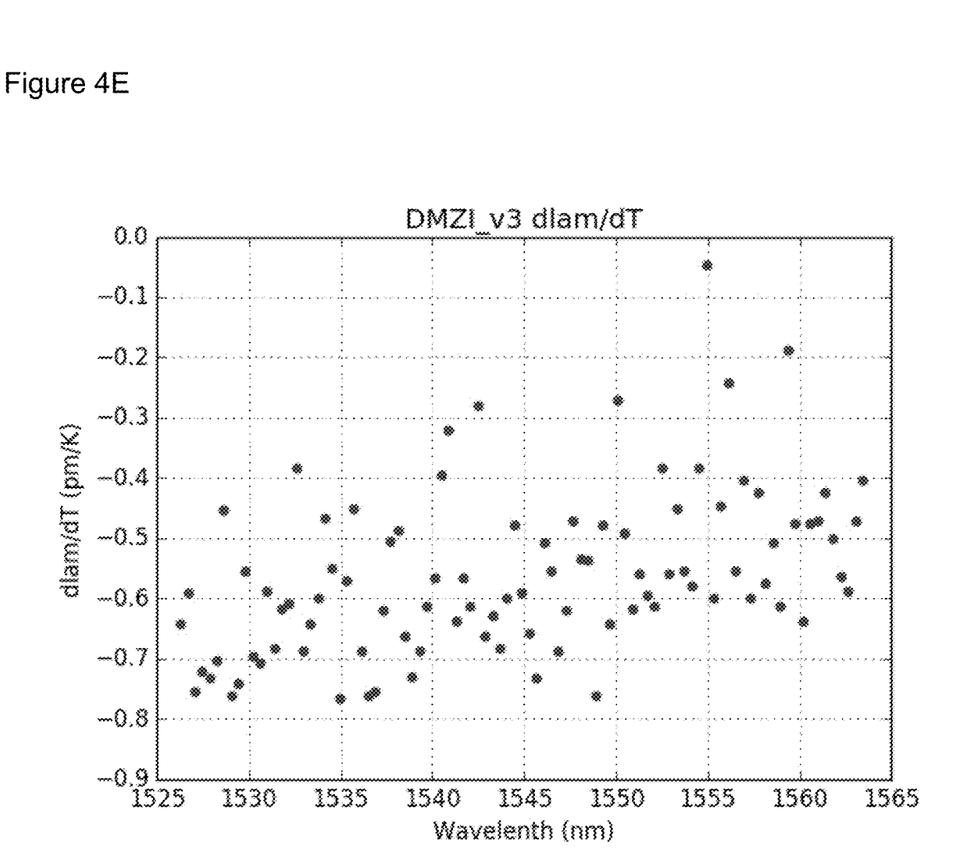
FIG. 4E is a plot of the change in wavelength with temperature vs wavelength for the optical filter device of FIG. 1.

FIG. 4E illustrates that a wavelength drift of <1 pm/° C. is achievable across the C-band (1530-1565 nm) for a 50 GHz fabricated design.

At least one tuning device, e.g. thermal tuners 4A and 4B, may be provided in one or both of the first and second MZ arms 13 and 14, i.e. in one or more of the waveguide sections 1, 2 or 3, for tuning the optical length of each of the first and second MZ arms 13 and 14, and therefore the spectrum of the optical filter device 10. The thermal tuners 4A and 4B enables the optical spectrum of the optical filter device 10 to be tuned to match the ITU grid at any predetermined or desired frequency spacing, such as common standard spacing frequencies of 25 GHz, 50 GHz, 100 GHz or 200 GHz. A portion, e.g. less than 10%, of the output signal may be tapped off after the combiner 16 and measured for power and/or wavelength by a monitor 19, comprised of a photodetector and/or other monitoring devices. The information from the monitor 19 may be sent to a controller 20, which controls the thermal tuners 4A and/or 4B.

The extinction ratio, i.e. the ratio between maximum and minimum transmission in dB, of the optical filter device 10 may be controlled by including a variable optical attenuator (VOA) 21 in one or both of the MZ arms 13 and 14 for attenuating optical power of one or both of the sub-beams.

The VOA 21 enables the loss in each arm to be controlled by the controller 20 as a function of applied voltage. The extinction ratio of the optical filter 10 may be adjusted by the controller 20 depending on the application of the optical filter device 10. For example: an etalon based on a monitor photodiode (MPD) would normally require a low extinction ratio, e.g. about 5 dB, while a frequency filter usually requires an extinction ration ER>30 dB. Accordingly, the inclusion of the VOA 21 enables control on the ER of the device. The controller 20 may also control the VOA 21 based on the output of the monitor 19.

Alternatively, the ER may also be set to a fixed value without requiring an active VOA 21, thereby minimizing power demand, by designing the UMZI 10 such that loss is balanced to a desired ratio between the two arms 13 and 14, while keeping the optical filter device 10 athermal and dispersion compensated by utilizing different types of waveguides.

To fully compensate for the phase difference introduced by the addition of an optical device to one of the MZ arms 13 or 14, for example, such as a taper in the waveguide section 2, 3 or 4, the polarization rotator 31, the VOA 21, and/or the thermal tuner 4A and 4B, a copy of the device may be included in the other MZ arm 13 or 14 of the optical filter device 10.

Another embodiment providing more precise temperature control relies on introducing temperature sending diodes (TSDs) 25 into the optical filter device for measuring temperature at various locations around the UMZI 10 or 30, and sending the information signals to the controller 20. The spectral response of the optical filter 10 or 30 is first characterized as a function of temperature, as sensed by the TSDs 25 for calibration. The filter wavelength may still be tuned by the controller 20 using phase tuners 4A and 4B in one or both arms 13 and 14. When the device temperature changes, the spectrum may be adjusted by the controller 20 based on the pre-recorded spectrum drift vs. temperature calibration table. TSDs 25 may be made to accurately detect temperate changes as sensitive as 0.2 degrees Celsius.

A single frequency thermally stable frequency filter may also be achieved by cascading multiple filters with different, e.g. increasing FSRs, such as disclosed in U.S. patent application Ser. No. 15/855,242 filed Dec. 27, 2017 (COR-318).

Figure 5:
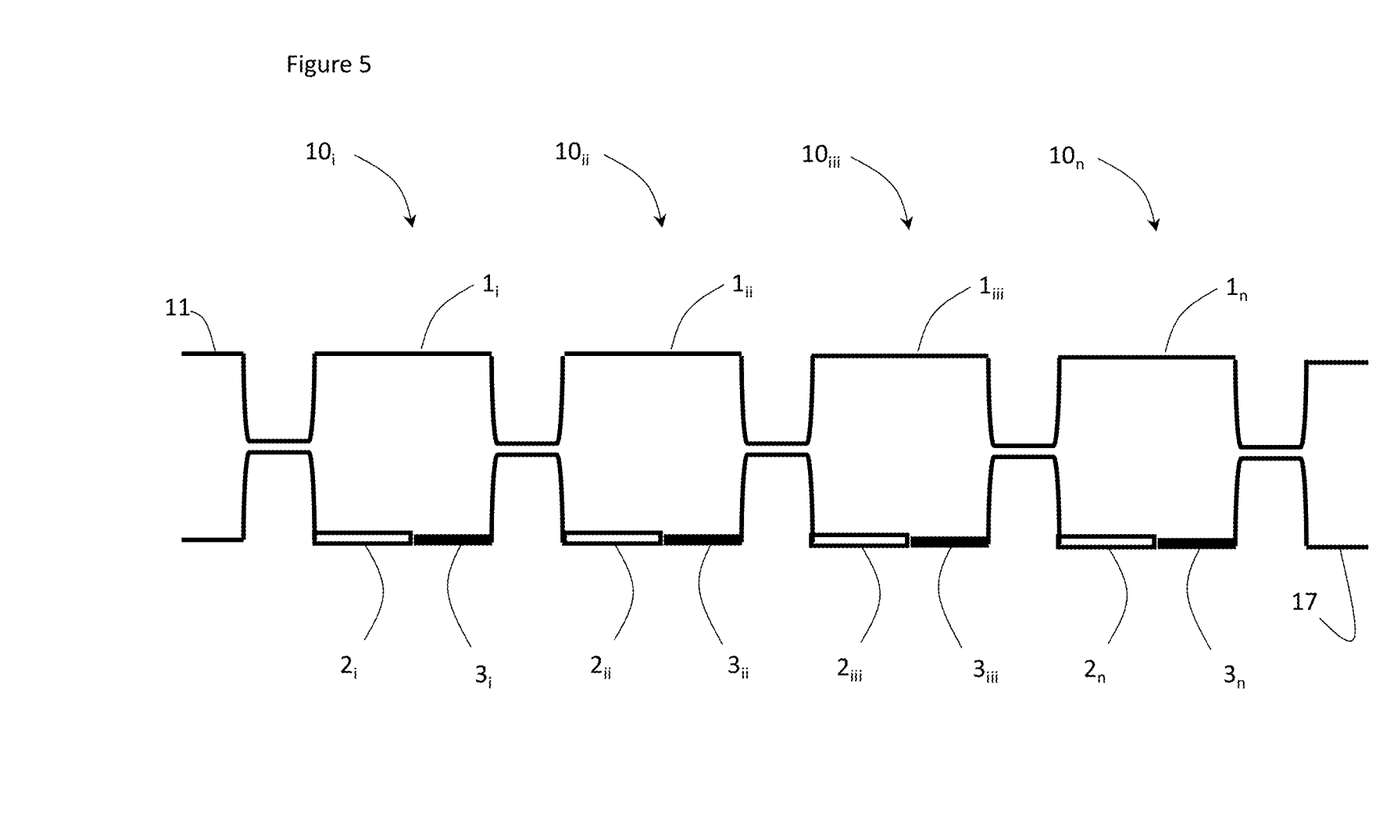
FIG. 5 is a schematic diagram of an optical filter system comprised of a plurality of the optical filter devices of FIG. 1.
Figure 6A:
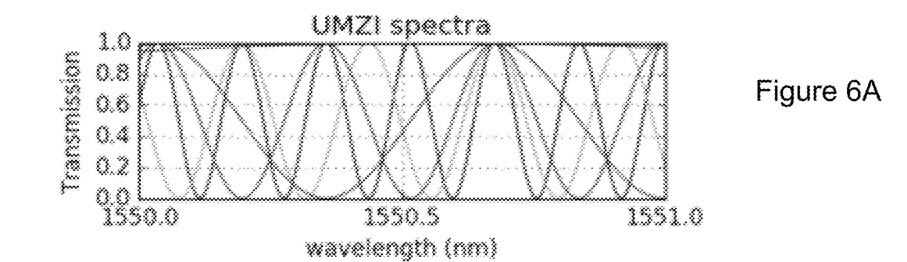
FIG. 6A is a plot of transmission vs wavelength (nm) of individual filters composing the cascaded optical filter system of FIG. 5
Figure 6B:
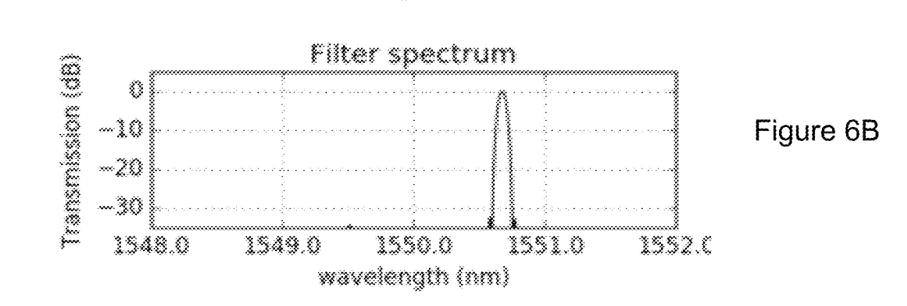
FIG. 6B is a plot of transmission (dB) vs wavelength (nm) for the optical filter system of FIG. 5 with a bandwidth of 3.5 GHz centered at 1550.67 nm.
Figure 6C:
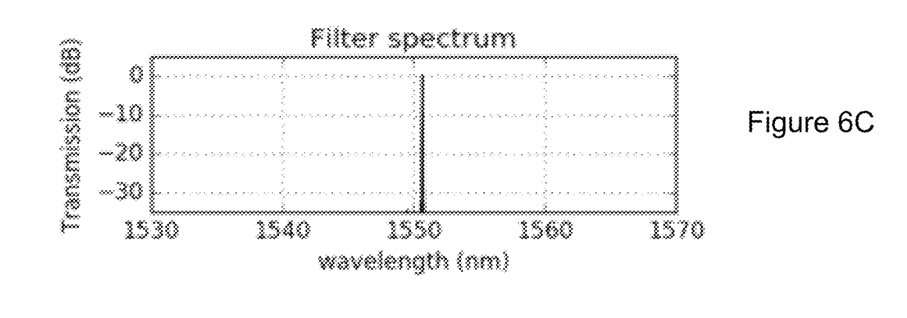
FIG. 6C is a plot of transmission (dB) vs wavelength (nm) for the optical filter system of FIG. 5 across the C-band.

With reference to FIG. 5, an optical filter 51 includes a plurality of cascaded UMZIs $10_i$ to $10_n$, each with first, second and third waveguide sections $1_i$ to $1_n$, $2_i$ to $2_n$ and $3_i$ to $3_n$. The lengths of each arm $13_i$ to $13_n$ and $14_i$ to $14_n$, and therefore each waveguide section $1_i$ to $1_n$, $2_i$ to $2_n$ and $3_i$ to $3_n$, are selected to provide different FSR to each UMZI $10_i$ to $10_n$, whereby each UMZI $10_i$ to $10_n$ is an athermal and/or dispersion free device and the overall device is therefore dispersion free and/or athermal. Alternatively, individual arms $13_i$ to $13_n$ and $14_i$ to $14_n$ or waveguide sections therein, in each UMZI $10_i$ to $10_n$, respectively, may each be a different type of waveguide, as hereinbefore defined, whereby each UMZI $10_i$ to $10_n$ may not be dispersion free and athermal, but the overall optical filter 51 may be. Each UMZI $10_i$ to $10_n$ includes a different FSR, and each UMZI $10_i$ to $10_n$ may have aligned spectra to coincide at a desired wavelength (see FIG. 6A), whereby a single frequency filter may be achieved calibrated to a desired spectral width and designed to function over a predetermined wavelength range. FIG. 6A shows the spectra of four UMZIs $10_1$ to $10_4$ with increasing FSRs which are calibrated to coincide at a wavelength of 1550.67 nm. By chaining the output of each UMZI $10_1$ to $10_4$ with the input of the next UMZI $10_1$ to $10_4$ with increasing FSR and aligning them to coincide at a desired wavelength a single frequency filter may be achieved with a determined bandwidth and range. FIG. 6B shows a single spike transmission spectrum with half-width-half-max (HWHM) bandwidth of 3.5 GHz centered 1550.67 nm, created by cascading multiple UMZIs $10_1$ to $10_4$ with increasing FSR from 20 GHz to 2000 GHz. The side-mode-suppression-ratio (SMSR) is >30 dB for the main peak. FIG. 6C shows the spectrum of the device with ER>30 dB across the C-band. Each UMZI $10_i$ to $10n$ in the optical filter 51 may be tuned using a phase shifter 4A or 4B, such as a thermal tuner, and a VOA 21, as hereinbefore described.

Figure 7:
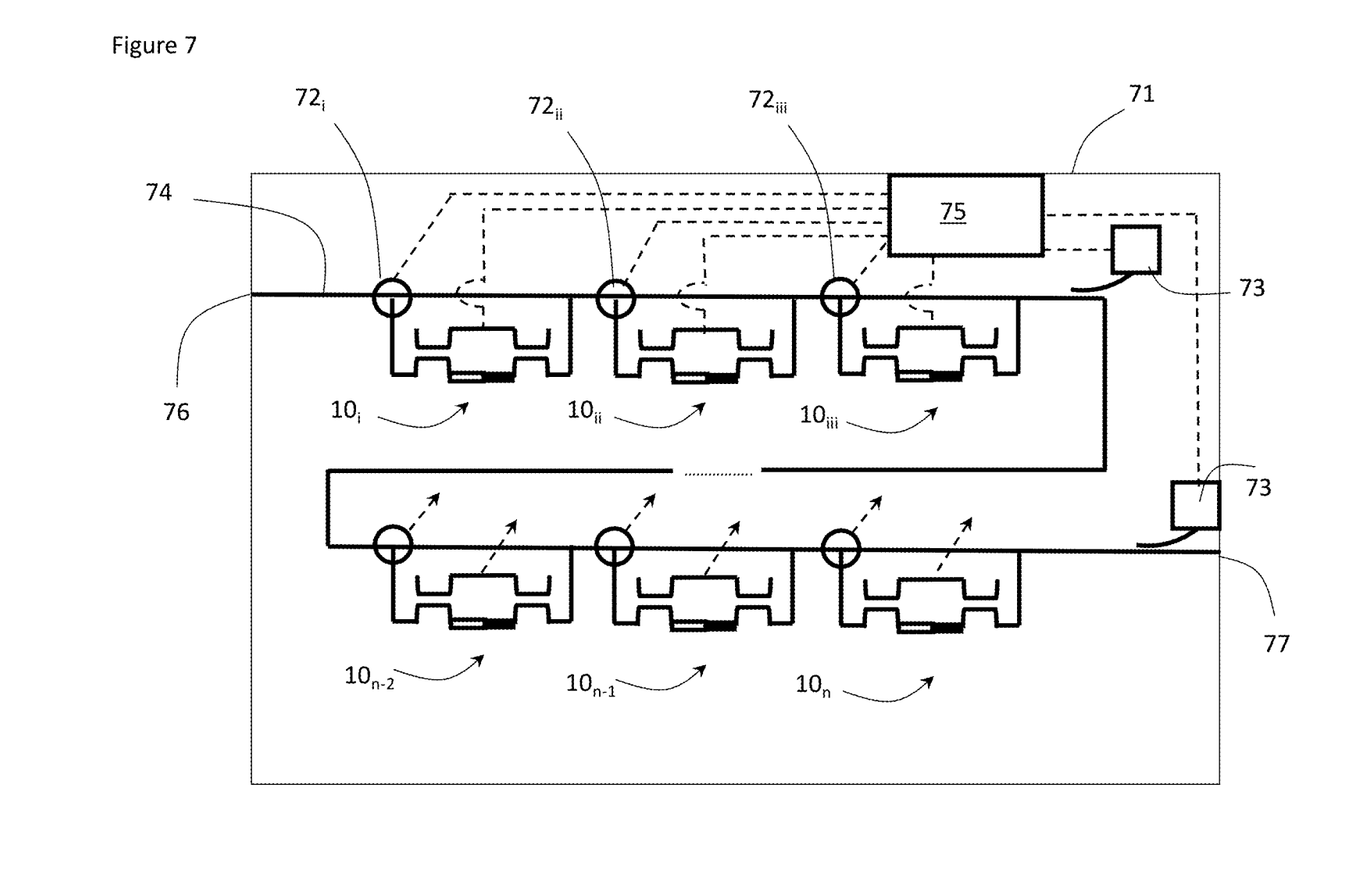
FIG. 7 is a schematic diagram of a reconfigurable optical filter system comprised of a plurality of the optical filter devices similar to that in FIG. 1A.

With reference to FIG. 7, a fully reconfigurable optical filter system 71 on chip includes multiple frequency filters $10_i$ to $10_n$ with different FSRs which may be interconnected with different combinations by using optical switches $72_i$ to $72_n$ thus enabling control of the range and bandwidth of the single frequency filter 71. A controller 75 of the optical filter system 71, either on the chip 71 or remote therefrom, may independently operate a plurality of switches $72_i$ to $72_n$, e.g. 1×2, 1×4 or 2×4, to optically couple any one or more of the optical filters $10_i$ to $10_n$ to the optical path 74 between an input 76 and an output 77. The optical filter 71 may be composed of M×N filter array which enables the use of any number for filters, i.e. from a single filter to M×N filters. The optical filters $10_i$ to $10_n$ may be arranged in increasing FSRs or any desired arrangement. For alignment purposes, a small portion, e.g. <10%, of the output light may be sent into a monitor photodetectors (PD) 73 electrically connected to the controller 75, prior to the output 77. The filters $10_i$ to $10_n$ may then be added or tuned, e.g. using thermal tuners 4A or 4B, as hereinbefore discussed, or other methods, by the controller 75, to maximize the PD current in the PD 73. A monitor photodetector 73 may be added at the end of each row of optical filters $10_i$ to $10_n$ and calibrate each row before adding the next one.

Each of the filters $10_i$ to $10_n$ may be athermal and/or dispersion free, as hereinbefore discussed, to enable stable operation. Each UMZI $10_i$ to $10_n$ in the optical filter 71 may be tuned using a phase shifter 4A or 4B, such as a thermal tuner, and a VOA 21, as hereinbefore described.

Figure 1C:
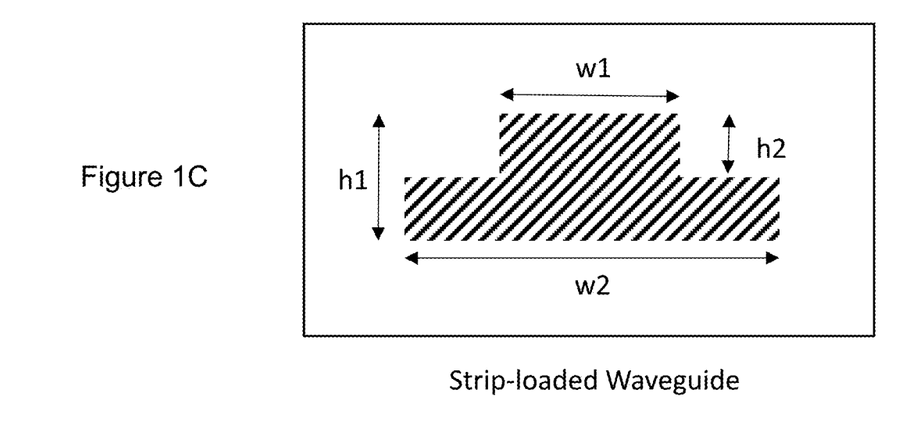
Figure 1D:
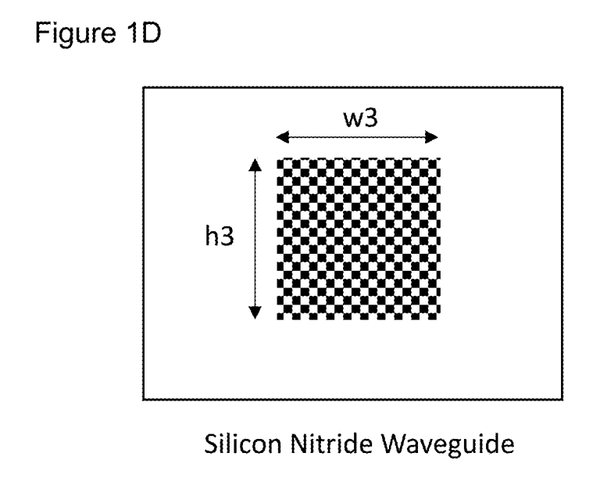

As seen in FIG. 1C and explained in the previous section, the optical filter system 71, is normally configured with respect to a single wavelength, e.g. 1550 nm, and then optimized to have a near flat response across the C-band. Notice from FIG. 1C that the thermal response is practically 0 at 1550 nm, and increases near the edges of the C-band. For an optical filter system which requires very high precision (<0.5 pm/° C.) across the C-band, it is possible to combine multiple UMZIs $10_i$ to $10_n$ which are designed to have near 0 response for a narrow wavelength range, whereby each optical filter $10_i$ to $10_n$ or group of filters $10_i$ to $10_n$ may be dedicated to a small wavelength segment of the C-band. For example, the C-band may be divided into four sections (each with a 10 nm-25 nm bandwidth) from 1530 nm to 1570 nm which will require the use of four individual or groups of UMZIs $10_i$ to $10_{iv}$, each one optimized for the middle of its dedicated wavelength range. Since each UMZI $10_i$ to $10_n$ will have near perfect athermal response within the dedicated wavelength range the total response would also be near perfect. This design also allows for close control of the dispersion without requiring a third waveguide section to be introduced to control dispersion.

Applications for the optical filter device 10 include wavelength reference for laser systems and communication systems, spectrometry, and other applications which require an optical frequency filter. A thermally-stable, on-chip single-frequency filter may also be achieved using the present invention. The optical filter device 10 may achieve any of the standard FSRs as well any desired FSR between 10 GHz and 2000 GHz while maintaining small footprint, low-cost, and very low reflection in comparison to commercially available alternatives.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An optical filter comprising:
an input port for inputting an input optical signal;
a splitter for splitting the input optical signal into first and second sub-beams;
a first arm for receiving the first sub-beam, the first arm comprising a first section comprised of a first type of waveguide, and a second section comprised of a second type of waveguide different than the first type of waveguide;
a second arm for receiving the second sub-beam, the second arm comprising a third section comprised of a third type of waveguide different than the first and second types of waveguides;
a combiner for combining the first and second sub-beams into a combined output optical beam;
an output port for outputting the output optical beam; and
a tuning device in at least one of the first arm and the second arm for tuning a spectrum of the optical filter;
wherein the first, second and third sections comprise lengths $L_1$, $L_2$ and $L_3$, respectively, configured to substantially thermally stabilize the optical filter in response to a change in temperature.

2. The optical filter according to claim 1, wherein each of the first, second and third types of waveguides comprise a different group index of refraction $n_1$, $n_2$ and $n_3$.

3. The optical filter according to claim 2, wherein a change of index $n_1$, $n_2$ and $n_3$ with temperature T and the lengths $L_1$, $L_2$ and $L_3$ of the first section, the second section and the third section, respectively, substantially satisfy the equation:

$$\frac{dn_1}{dT}L_1 - \frac{dn_2}{dT}L_2 - \frac{dn_3}{dT}L_3 = 0.$$

4. The optical filter according to claim 1, wherein each of the first, second and third waveguide sections comprises at least one of a different type of shape, and a different type of material.

5. The optical filter according to claim 4, wherein at least one of the first, second and third waveguide sections comprises a different shape selected from the group consisting of slab waveguide, ridge waveguide, strip-loaded waveguide, and W shaped waveguide.

6. The optical filter according to claim 4, wherein at least one of the first, second and third waveguide sections comprises a different material selected from the group consisting of semiconductor waveguide and dielectric waveguide.

7. The optical filter according to claim 6, wherein at least one of the first, second and third waveguide sections comprises a different material selected from the group consisting of silicon, silicon nitride, and silicon oxynitride.

8. The optical filter according to claim 4, wherein the first and second sub-beams are input with a same first polarization; and
wherein one of the first, second and third waveguide sections comprises a first polarization rotator proximate a beginning thereof for rotating a polarization of one of the first or second sub-beam from a first polarization to a second polarization different than the other of the first or second sub-beam, and a second polarization rotator proximate an end thereof for rotating the polarization of the first or second sub-beam back to the first polarization.

9. The optical filter according to claim 8, wherein the first polarization comprises a TE polarization and the second polarization comprises a TM polarization.

10. The optical filter according to claim 1, wherein the first waveguide section is comprised of a silicon ridge waveguide, the second waveguide section is comprised of a strip-loaded waveguide, and the third waveguide section is comprised of a silicon nitride ridge waveguide.

11. The optical filter according to claim 1, further comprising:
   at least one temperature diode for measuring a temperature of the optical filter; and
   a controller configured to adjust the spectrum of the optical filter in response to the temperature of the optical filter changing, based on a pre-recorded spectrum drift vs. temperature calibration.

12. An optical filter system comprising a plurality of optical filters according to claim 1, wherein each optical filter comprises a different FSR from each other;
   and wherein each FSR coincides at a predetermined wavelength.

13. An optical filter system comprising a plurality of optical filters according to claim 1, wherein each optical filter comprises an FSR; and wherein each FSR coincides at a different predetermined wavelength.

14. The optical filter system according to claim 13, wherein each predetermined wavelength comprises a center wavelength of a predetermined segment forming a plurality of adjacent wavelength segments.

15. The optical filter system according to claim 14, wherein each wavelength segment is about 10 nm to 25 nm wide.

16. The optical filter system according to claim 14, further comprising a plurality of switches; wherein the plurality of switches are configured to selectively add or remove a corresponding one of the plurality of optical filters from an optical path.

17. An optical filter comprising:
   an input port for inputting an input optical signal;
   a splitter for splitting the input optical signal into first and second sub-beams;
   a first arm for receiving the first sub-beam, the first arm comprising a first section comprised of a first type of waveguide, and a second section comprised of a second type of waveguide different than the first type of waveguide;
   a second arm for receiving the second sub-beam, the second arm comprising a third section comprised of a third type of waveguide different than the first and second types of waveguides;
   a combiner for combining the first and second sub-beams into a combined output optical beam;
   an output port for outputting the output optical beam; and
   an attenuator in at least one of the first and second arms for tuning an extinction ratio of the optical filter;
      wherein the first, second and third sections comprise lengths $L_1$, $L_2$ and $L_3$, respectively, configured to substantially thermally stabilize the optical filter in response to a change in temperature.

18. The optical filter according to claim 17, further comprising a tuning device in at least one of the first and second arms for tuning a spectrum of the optical filter.

19. An optical filter system comprising:
   a plurality of optical filters, at least some of the plurality of optical filters comprising:
      an input port for inputting an input optical signal;
      a splitter for splitting the input optical signal into first and second sub-beams;
      a first arm for receiving the first sub-beam, the first arm comprising a first section comprised of a first type of waveguide, and a second section comprised of a second type of waveguide different than the first type of waveguide;
      a second arm for receiving the second sub-beam, the second arm comprising a third section comprised of a third type of waveguide different than the first and second types of waveguides;
      a combiner for combining the first and second sub-beams into a combined output optical beam;
      an output port for outputting the output optical beam;
      wherein the first, second and third sections comprise lengths $L_1$, $L_2$ and $L_3$, respectively, configured to substantially thermally stabilize the at least one of the plurality of optical filters in response to a change in temperature;
      wherein at least some of the plurality of optical filters comprises a different FSR from each other; and wherein each FSR coincides at a predetermined wavelength; and
   wherein the optical filter system further comprises a plurality of switches;
   wherein the plurality of switches are configured to selectively add or remove a corresponding one of the plurality of optical filters from an optical path.

* * * * *